United States Patent [19]

Bertelson

[11] Patent Number: 5,073,315
[45] Date of Patent: Dec. 17, 1991

[54] METHODS FOR MAKING FIBER REINFORCED WHEELS AND OTHER STRUCTURAL MOLDINGS

[76] Inventor: Peter C. Bertelson, 30325 Ponds View Dr., Franklin, Mich. 48025

[21] Appl. No.: 453,618

[22] Filed: Dec. 19, 1989

[51] Int. Cl.⁵ .................... B60B 3/12; B29C 43/18
[52] U.S. Cl. .................... 264/25; 264/257; 264/259; 264/296; 301/63 PW
[58] Field of Search ............ 264/257, 258, 317, 108, 264/510, 511, 512, 25, 259, 296; 301/63 PW

[56] References Cited

U.S. PATENT DOCUMENTS

| | | | |
|---|---|---|---|
| 4,106,967 | 8/1978 | Logan | 264/108 |
| 4,207,778 | 6/1980 | Hatch | 74/572 |
| 4,294,490 | 10/1981 | Woelfel | 301/63 PW |
| 4,379,098 | 4/1983 | Gumieeny | 264/27 |
| 4,421,582 | 12/1983 | Horsma | 264/27 |
| 4,462,946 | 7/1984 | Goldsworthy | 264/25 |
| 4,532,097 | 7/1985 | Daniels | 264/258 |
| 4,537,092 | 8/1985 | Kulkarni et al. | 74/572 |
| 4,660,435 | 4/1987 | Davis et al. | 74/572 |
| 4,661,299 | 4/1987 | Thorsrud | 264/25 |
| 4,673,541 | 6/1987 | Watanabe | 264/25 |
| 4,749,235 | 6/1988 | McDougall | 301/63 PW |
| 4,832,414 | 5/1989 | Jones | 301/63 PW |

FOREIGN PATENT DOCUMENTS

1-047516  2/1989  Japan .......................... 264/500

Primary Examiner—Jay H. Woo
Assistant Examiner—Jeremiah F. Durkin, II
Attorney, Agent, or Firm—Arnold, White & Durkee

[57] ABSTRACT

Fibers are oriented in a radial direction in a mold so that the fibers are aligned in the molded article to react to radial loads. This is done by contracting a tubular braid of reinforcing fiber about its axis and expanding the contracted braid radially. The time for curing the article in the mold is reduced by internal electrical heating. The preferred ways of internal electrical heating are microwave heating, and the application of current to an internal conducting layer, conductive fibers or a grid for resistive heating. Moreover, the appearance of the molded article is improved by a sheet metal insert which is formed, for example by stamping or spinning, to match a face of the mold. The metal can be polished and chromed either before or after the molding process.

9 Claims, 3 Drawing Sheets

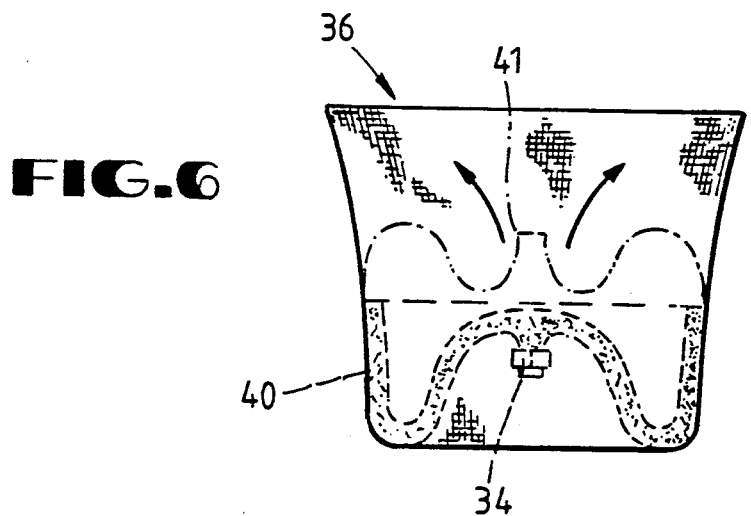
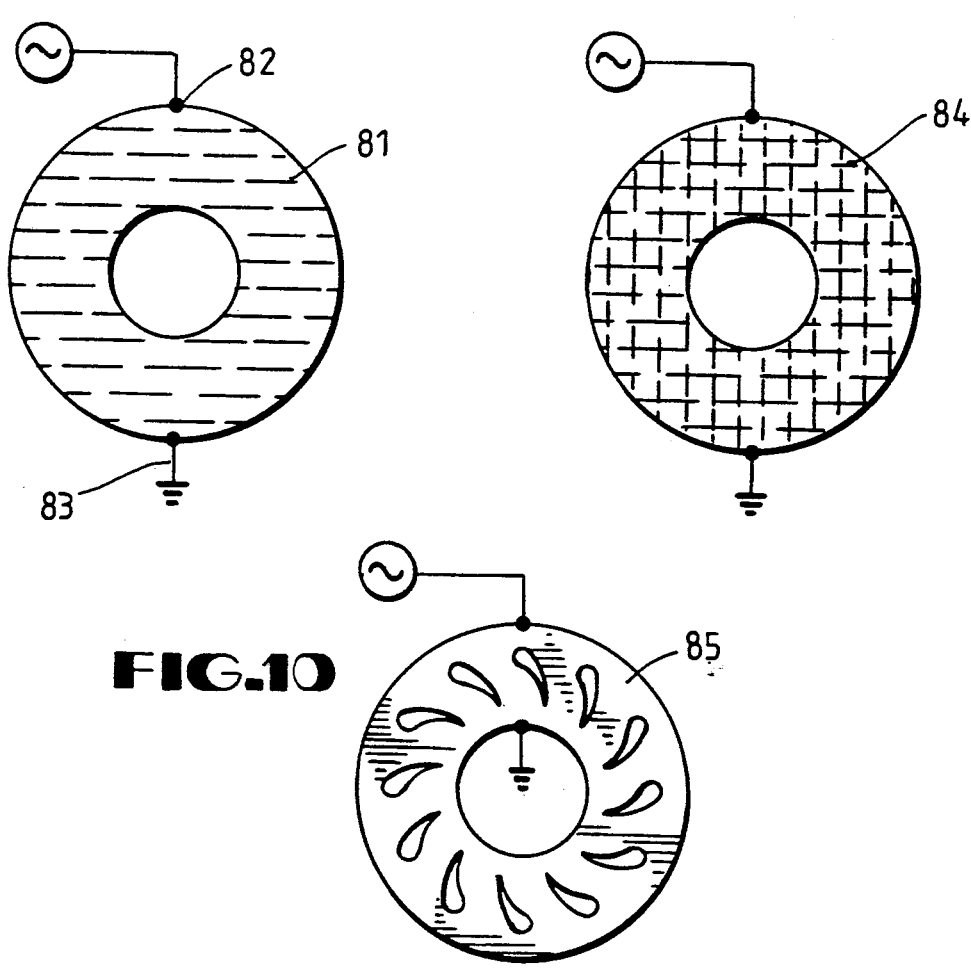

METHODS FOR MAKING FIBER REINFORCED WHEELS AND OTHER STRUCTURAL MOLDINGS

BACKGROUND OF THE INVENTION

1. Technical Field

The present invention relates generally to fiber reinforced structural moldings such as heavy truck wheels, and more specifically to techniques for improving the strength and appearance of the moldings and for reducing molding time.

2. Description of the Related Art

Composite structures made with plastic resin are typically reinforced with chopped or continuous fibers. Greater strength and stiffness result when the fibers are straight and continuous. Exceptional properties result when plies of unidirectional fiber are bonded in layers, each in a different direction. Similar, approximately isotropic, properties result when cloth reinforcement is used.

Heavy truck wheels have been made of fiberglass, and they can have much greater strength than steel wheels. These fiberglass wheels have used sheet molding compound (SMC) having random fiber orientation. More complicated structures including various radial, axial and circumferential unidirectional fiber layers are described in McDougall U.S. Pat. No. 4,749,235. Commercial manufacture of fiberglass truck wheels, however, has not occurred. This is probably due to the cost of capital investment, labor and materials in the manufacturing process.

Various molding processes have been used for manufacturing fiber reinforced flywheels. In this case the complications of the manufacturing process are justified by the absence of alternative materials having the desired characteristics of low weight and high strength. In Kulkarni et al. U.S. Pat. No. 4,537,091, for example, it is said that some prior art flywheels have been made by the vacuum-bag/press-molding method. See Col. 3, lines 12 to 26. This method is said to consist of forming directionally ordered stacks of plies of uncured unidirectional composites. The stacks are vacuum-bag compacted and combined into layups. Each layup is put into a press and cured under vacuum at elevated temperatures. A flywheel is formed from the layup by removing it from the press and machining it as necessary.

In Col. 4, lines 54-64, Kulkarni et al. further describe a matched-die molding process for molding parts of SMC available commercially from Owens-Corning Fiberglass Corporation. The SMC sheet is formed by compacting high strength fiberglass roving and resin/filler paste between layers of carrier film. After maturation in a controlled environment, the carrier film is removed from the SMC. Then plies cut from the sheet are positioned upon one another to form a charge for placement in an appropriate mold. A part is formed from the charge when the mold is closed and subjected to the proper temperature and pressure in a matched-die molding process.

A reinforced composite flywheel made of stacked cross-ply layers is disclosed in Hatch U.S. Pat. No. 4,207,778.

A flywheel having fibers wound circumferentially about a rim is disclosed in Davis et al. U.S. Pat. No. 4,660,435. The circumferentially wound fibers are enclosed by a shell formed by fibers wound in a plurality of overlapping segments, the general direction of the fibers in each segment being tangential to the rim surface.

SUMMARY OF THE INVENTION

Accordingly, the primary object of the invention is to provide more cost-effective ways of manufacturing fiber-composite wheels and other fiber-composite structural members.

A related object is to provide a practical method of orienting fibers in a mold for a wheel so that the fibers in the molded wheel are aligned to react the applied loads, and therefore to reduce the required amount of material.

Still another object is to reduce the amount of time that is needed in the molding process.

Yet another object of the present invention is to improve the appearance of the molded article.

Briefly, in accordance with one aspect of the invention, fibers are oriented in a generally radial direction in a mold by contracting a tubular braid of reinforcing fiber about its axis and expanding the braid radially. The radially-oriented fiber should be disposed near the faces of the molded article, and less expensive, randomly oriented material can be used elsewhere.

In accordance with another aspect of the invention, the time for curing the article in the mold is reduced by internal electrical heating. The preferred ways of internal electrical heating are microwave heating, and the application of current to an internal conducting layer, conductive fibers, or a grid for resistive heating.

In accordance with yet another aspect of the invention, the appearance of the molded article is improved by a sheet metal insert which is formed, for example by stamping or spinning, to match a face of the mold. The metal can be polished and chromed either before or after the molding process.

BRIEF DESCRIPTION OF THE INVENTION

Other objects and advantages of the invention will become apparent upon reading the following detailed description and upon reference to the drawings in which:

FIG. 6 shows an inverted braid being opened to form a bag to receive filler material;

FIG. 8 illustrates a slit plate heating layer;

FIG. 9 illustrates a grid heating layer; and

FIG. 10 illustrates a pierced plate heating layer.

Figure 1:
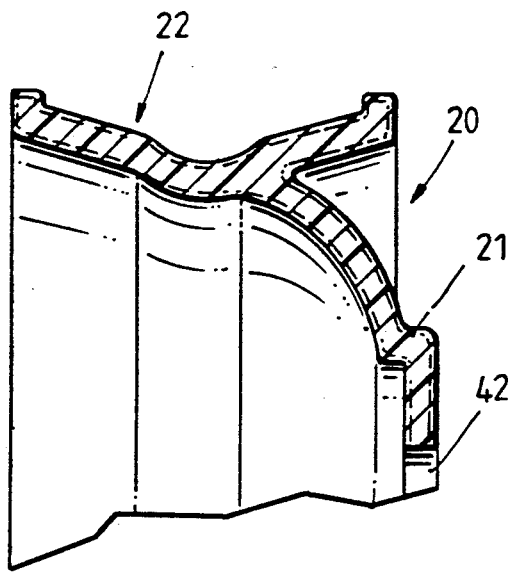
FIG. 1 is a sectional view of a truck wheel taken along line 1—1 of FIG. 2.

While the invention is susceptible to various modifications and alternative forms, specific embodiments thereof have been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 2:
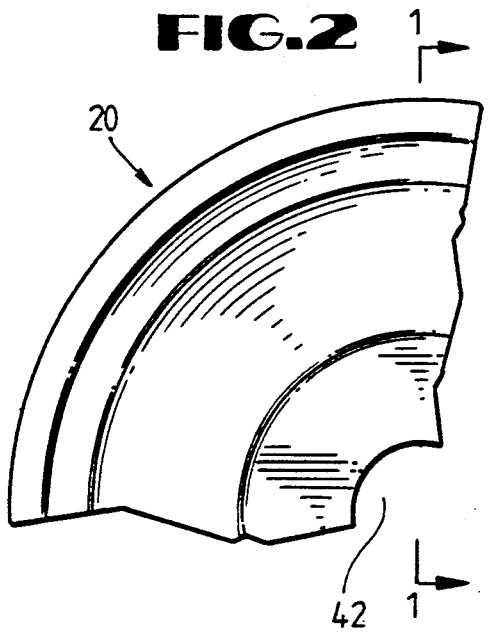
FIG. 2 is a front view of the truck wheel in FIG. 1.

Turning now to FIGS. 1 and 2, there is shown a truck wheel generally designated 20 manufactured in accordance with the present invention. The truck wheel 20 is made of fiber reinforced resin such as fiberglass-epoxy. For the wheel 20, it is desired to have the fibers of the disc aligned in a generally radial direction, as shown in FIG. 1, and to have the fibers disposed near the surfaces of the wheel 20. Locating the fibers 21 in this fashion aligns them with the radial and cornering loads placed upon the wheel 20 during normal use. Therefore the wheel is stronger and stiffer in the direction needed to react to the radial and cornering loads, and consequently the wheel can be made with less total material. This reduces the cost of the wheel not only because of the reduced amount of resin and reinforcing fiber, but also because a wheel that is thinner needs less time to cure in the mold. The wheel can be manufactured more quickly, and the allocated manufacturing cost per article is reduced.

The desired alignment of the fibers 21 is obtained by using tubular braid. Tubular braid is a rather inexpensive form of continuous fiber reinforcement, and it also has the advantage that the reinforcement per unit area is increased towards the wheel axis. Also, a single braided tube is sufficient to reinforce almost the entire outer surface of the wheel 20. At the rim 22, for example, the fiber is oriented at plus and minus 45 degrees with respect to the circumferential direction around the wheel, and the fibers become radial toward the center of the wheel where the radial load is a maximum.

Figure 3:
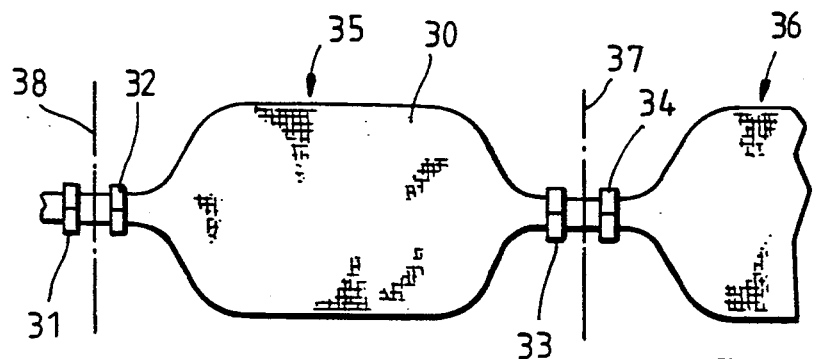
FIG. 3 is a diagram showing the contraction of a tubular braid along its axis and expansion of that braid in a radial direction.

Turning now to FIG. 3, there is shown a large-diameter braided tube 30 that is clamped by clamps 31, 32, 33 and 34. The double clamps separate the tube into braid segments such as the segment 35 and the segment 36 which are separated by the plane 37. One or more braid segments can be used to form each wheel. The braid segments are separated from each other by cutting the braid along the planes 37 and 38.

Figure 4:
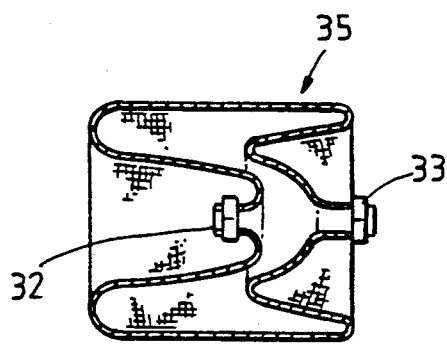
FIG. 4 is a sectional view showing the inversion of a braid segment to make a preform to suit a wheel mold.
Figure 5:
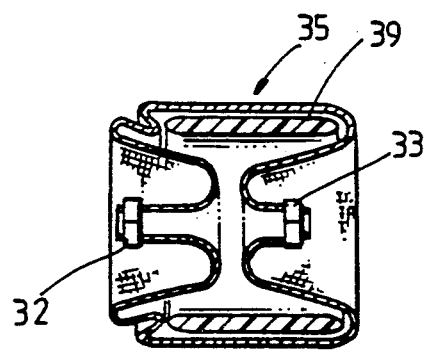
FIG. 5 is a sectional view showing the wrapping of the inverted braid segment around rim reinforcement.

FIG. 4 shows the inversion of the braid segment 30 to make a preform to suit a wheel mold. As further shown in FIG. 5, there can be multiple layers of reinforcement from the same braid simply by creating overlaps. In FIG. 5, for example, there is an overlap of the braid around a rim reinforcement 39 that could be made, for example, of SMC material.

As further shown in FIG. 6, material 40 of lesser strength for interior portions of the wheel can be added to a braid segment such as the segment 36 by opening one end 41 to form a bag. The filler material 40 can be spread within the bag and then the top of the bag can be closed and then again clamped. Distribution of the filler material takes place so long as the total charge exceeds the volume of the mold cavity. After curing in the mold, the wheel is removed from the mold and the clamps on the wheel axis are machined off when the center hole (42 in FIG. 1) and mold flash are cut from the completed wheel.

Figure 7:
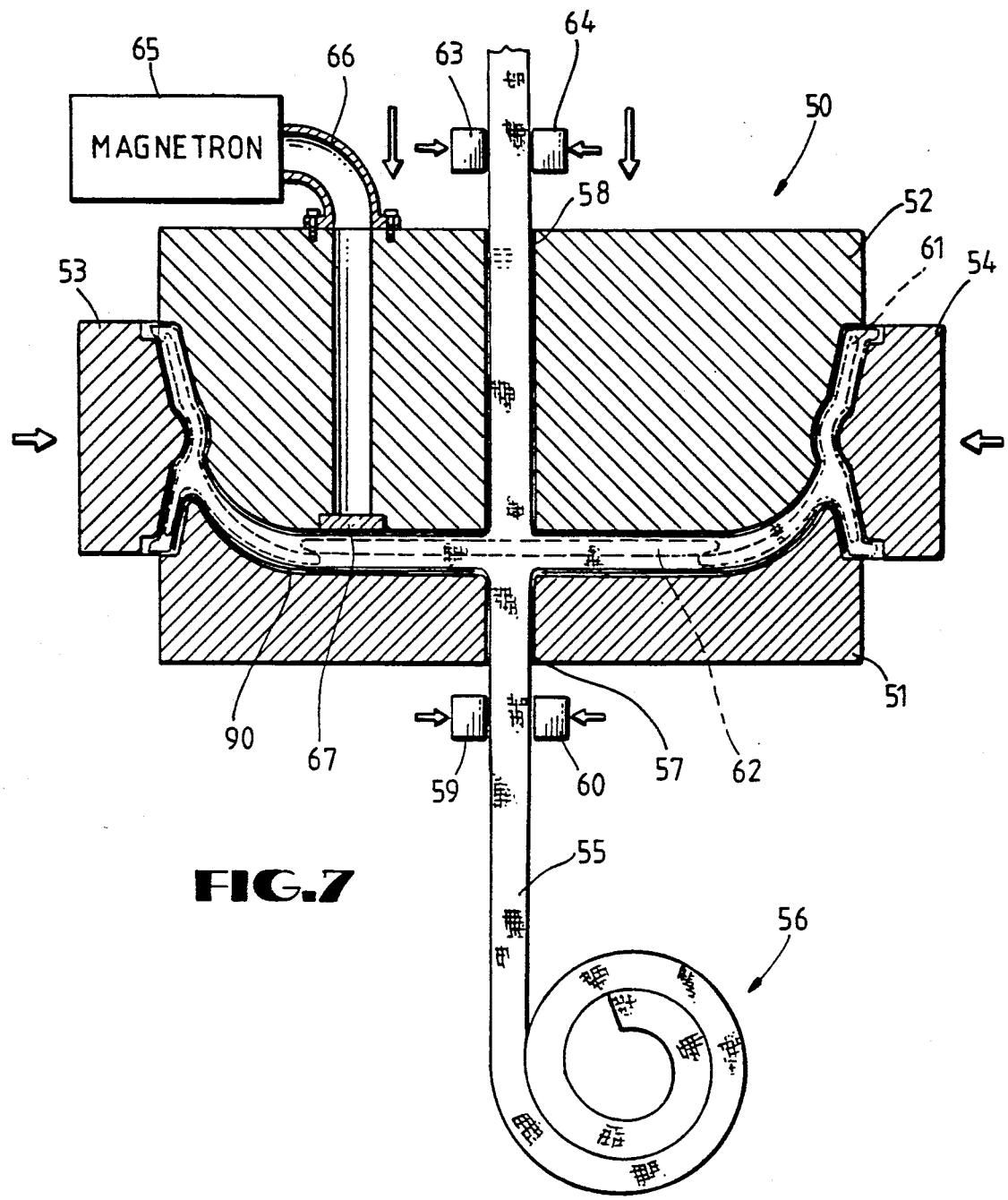
FIG. 7 is a schematic diagram illustrating the preferred process for molding wheels using reinforcement from a supply of tubular braid.

Turning now to FIG. 7, there is shown a schematic diagram illustrating the preferred molding process. The mold generally designated 50 includes a lower die 51 and an upper punch 52. In addition, the rim and drop-center well of the wheel is formed by a number of slides 53, 54 which slide in an inward radial direction and are circumferentially disposed about the die 51 and the punch 52.

Preferably there are three kinds of mold charge. First, large-diameter fiber braid 55 from a supply generally designated 56 is threaded through axial holes 57 in the die and 58 in the punch 52. To start a molding cycle, the braid is pulled through the die 51, clamped at the die by clamps 59, 60 and then opened to a diameter of about two feet to create a bag in the fashion previously discussed in connection with FIG. 6. Then the second kind of charge, a "lamp shade" of directed glass reinforcement 61, is inserted, optionally, to form much of the rim. Finally, sheet-molding compound (SMC) 62 is placed as a gummy blanket into the center of the mold.

Next, the top of the braid is pulled together, thereby closing the "bag", and put in tension by clamps 63 and 64 working together and by clamps 59 and 60. The fiber of the braid aligns itself in a generally radial direction due to the tension, and the punch 52 is drawn toward the die 51 to put pressure on the mold charge. The mold charge becomes distributed throughout the mold cavity, and gradually polymerizes or cures to the desired rigid shape, due to heating of the mold.

After curing, the clamps 59, 60 are released and the mold is open. Removal of the wheel draws additional braid into the mold and the cycle is repeated.

The molded part is finished by machining a hole for the valve stem of the tire, and by machining the hole (42 in FIG. 1) at the center of the wheel. Machining of the hole at the center of the wheel removes braid which is not part of the wheel.

The time for curing the mold charge comprises the majority of the time for the molding cycle. For the case of a heated mold, the curing time is dictated by the wheel thickness since it is governed by the time for thermal conduction to the central portions of the wheel. For a fiber-reinforced plastic heavy truck wheel, the wheel thickness approaches an inch and the curing time is approximately one hour.

In accordance with another aspect of the present invention, the curing of the resin is accelerated by internal electrical heating. As shown in FIG. 7, for example, a magnetron 65 generates microwave energy at a frequency, for example, of about 2.45 GHz, and the microwave energy is fed through a wave guide 66 and through a quartz window 67 into the mold cavity. The microwave energy is absorbed by dielectric loss in the chopped glass fiber of the sheet molding compound. In addition, the absorption of the microwave energy can be enhanced by using fibers of conductive material such as carbon or by rendering the glass fibers conductive by plating with a conductive material such as copper, nickel or aluminum. In this case not all of the fibers need be conductive. Also, the conductive fibers can be cut to a quarter wave length of the microwave energy to thereby act as quarter wave resonant antennas for enhanced energy absorption. For a frequency of 2.45 GHz, for example, a quarter wave length is approximately 0.82 inches.

As an alternative to microwave heating, the resin in the mold can be internally heated by passing electrical current through an electrical circuit path disposed in the resin. Preferably the electrical circuit path is defined by one or more heating layers in the form of a disc. As shown in FIG. 8, the disc can be in the form of a slit plate 81 to increase the electrical resistance between contact points 82 and 83, and to provide for good bonding between the disc and the resin. Alternatively, the disc can be in the form of a slit grid or screen 84 as shown in FIG. 9, or in the form of a pierced plate 85 as shown in FIG. 10. The disc could also be in the form of a layer or screen of metal-plated glass fibers.

In accordance with another aspect of the invention, the appearance of the finished wheel is improved by bonding a sheet metal insert to the wheel during the molding process. For this purpose, the sheet metal insert is formed, for example by stamping or spinning, to match the face of the mold corresponding to the outer face of the wheel. For the mold in FIG. 7, this corresponds to the die 51, and the sheet metal insert is designated 90. The insert 90 can be very thin, such as 0.01 or 0.02 inches thick. The metal can be polished and chromed either before or after the molding process, to provide a shiny wheel.

In view of the above, there have been described more costeffective ways of manufacturing fiber-composite wheels and other fiber-composite structural members. By contracting a tubular braid of reinforcing fiber about its axis and expanding the braid radially, it is very easy to orient fibers in a mold for a wheel so that the fibers in the molded wheel are aligned to react to the applied loads. The amount of time that is needed in the molding process can be reduced by internal electrical heating, for example, by microwaves. Also, the appearance of the molded article is improved by bonding a thin sheet metal layer to the outer face of the wheel during the molding process.

I claim:

1. A method of making a fiber reinforced resin article comprising oriented reinforcing fibers, said method comprising the steps of:
   (a) placing said reinforcing fibers and resin in a mold;
   (b) curing said resin in said mold to form said article; and
   (c) removing said article from said mold,
   wherein said method further comprises orienting said reinforcing fibers by contracting a tubular braid of said reinforcing fibers along an axis of said braid and expanding said braid radially with respect to said axis of said braid.

2. The method as claimed in claim 1, further comprising the step of placing resin and randomly oriented fiber into the tubular braid.

3. The method as claimed in claim 1, wherein said step (b) of curing said resin includes internal electrical heating of said resin.

4. The method as claimed in claim 3, wherein said electrical heating is performed by applying microwave energy into said mold.

5. The method as claimed in claim 4, wherein said microwave energy is absorbed by conductive reinforcing fibers in said resin.

6. The method as claimed in claim 1, further comprising the step of placing a sheet metal insert in said mold against a face of said mold, so that the sheet metal insert is bonded to the molded article when the molded article is removed from the mold.

7. The method as claimed in claim 1, wherein said mold defines a cavity that is radially symmetric about an axis, and wherein said reinforcing fibers are oriented in a generally radial direction with respect to said axis.

8. A method for making a molded article, said article including oriented fibers, said method including the steps of:
   (a) placing a matrix material and said fibers in a mold;
   (b) forming said article in said mold; and
   (c) removing said article from said mold;
   wherein the improvement comprises orienting said fibers by contracting a tubular braid of said fibers along an axis of said braid and expanding said braid radially with respect to said axis of said braid.

9. The method as claimed in claim 8, wherein said mold defines a cavity that is radially symmetric about an axis, and wherein said fibers are oriented in a generally radial direction with respect to said axis.

* * * * *